March 30, 1971 A. S. REICHLER ET AL 3,572,996
ANALYTICAL CHROMATOGRAPHY COLUMN MONITORING SYSTEM
Filed Nov. 29, 1967 3 Sheets-Sheet 1
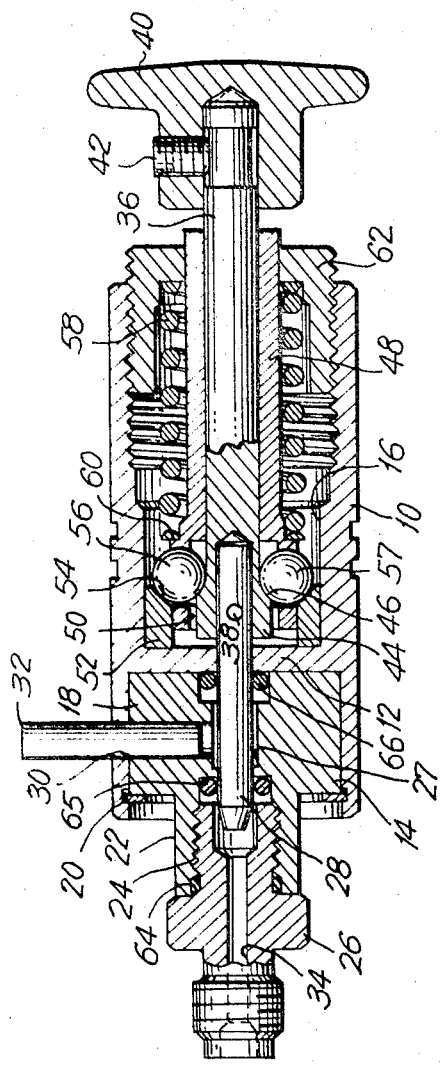
FIG.1
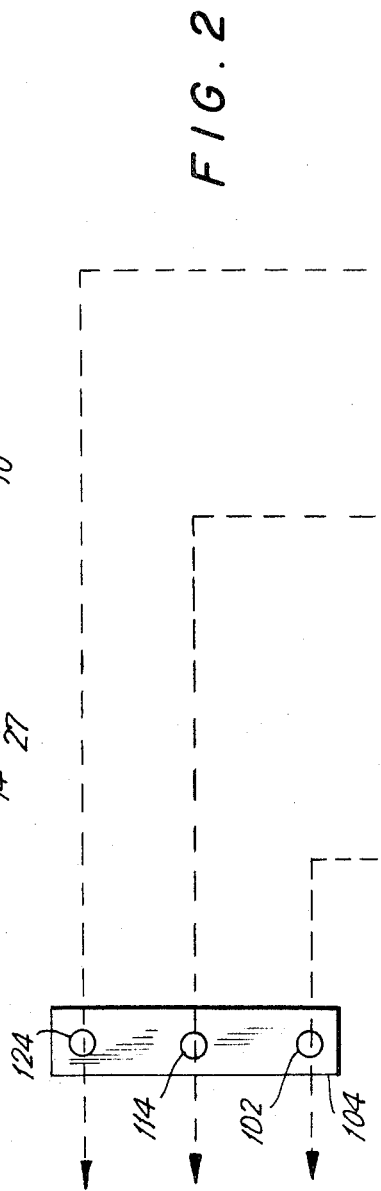
FIG.2
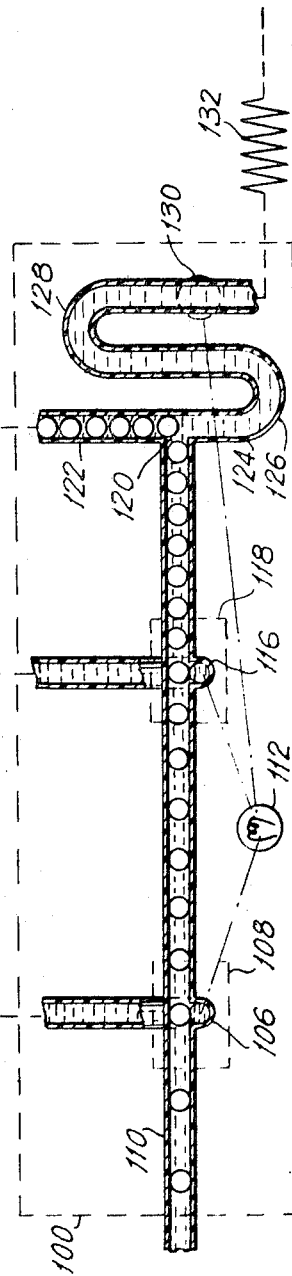
INVENTORS
NELSON G. KLING
ALLEN S. REICHLER
BY
ATTORNEY

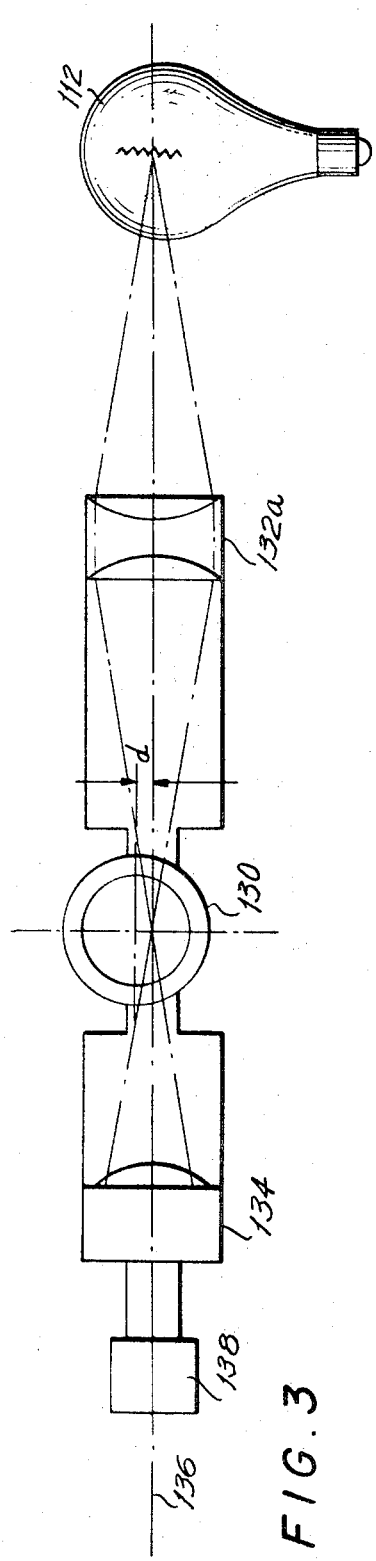
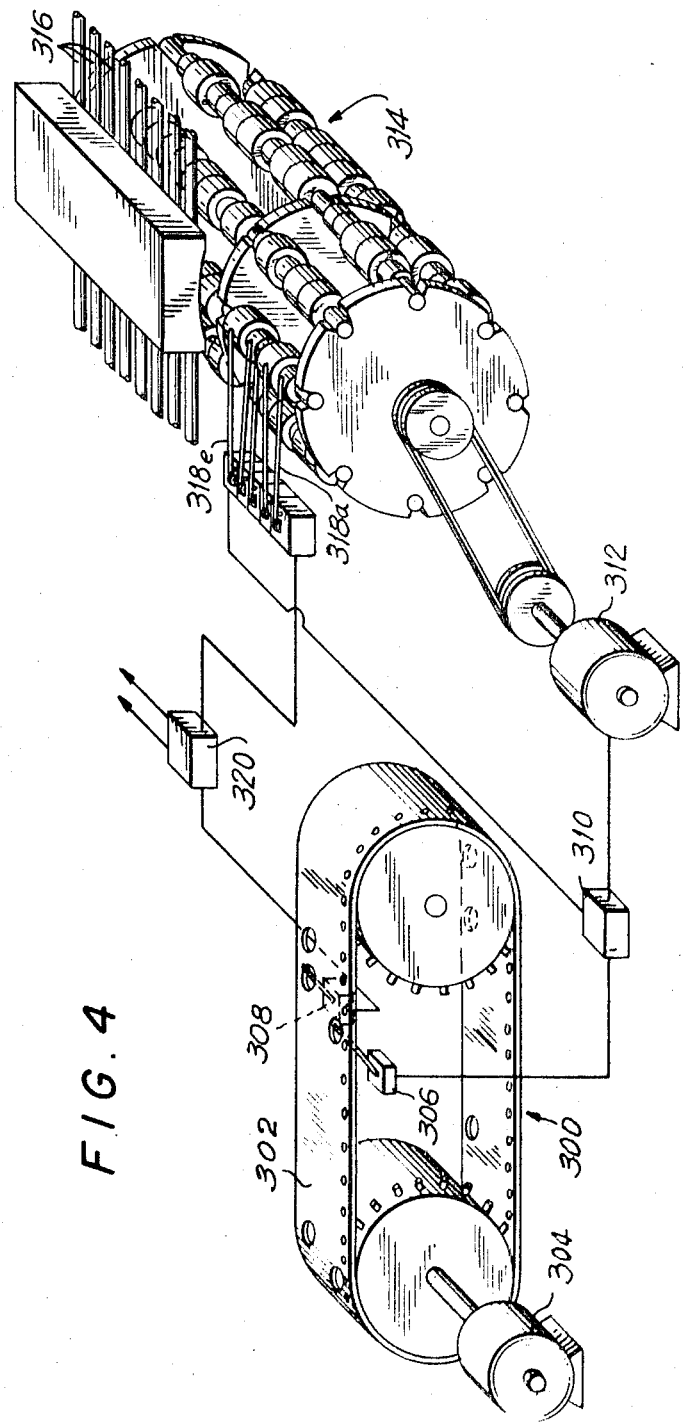

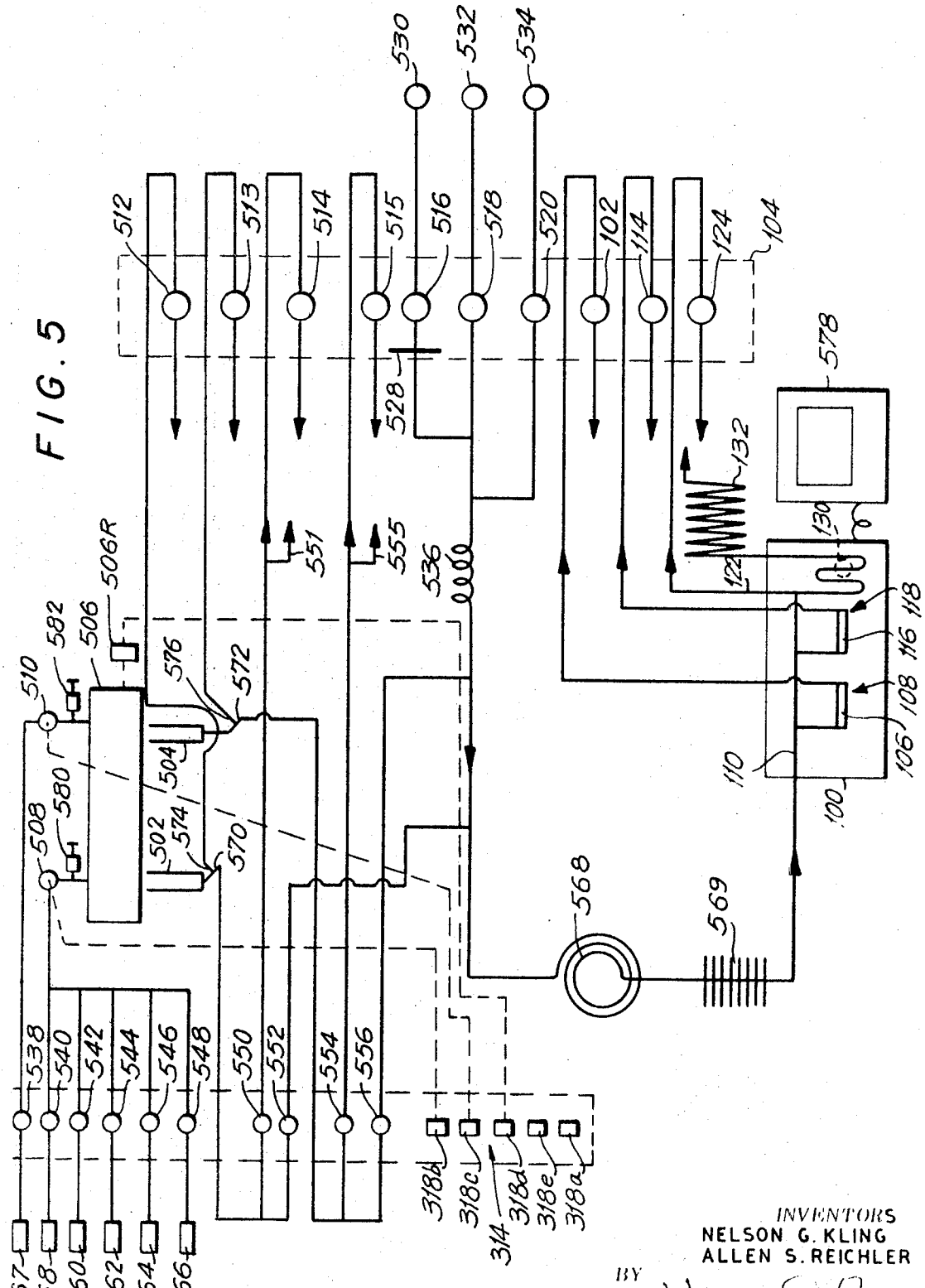

United States Patent Office 3,572,996
Patented Mar. 30, 1971

3,572,996
ANALYTICAL CHROMATOGRAPHY COLUMN MONITORING SYSTEM
Allen S. Reichler, Pearl River, N.Y., and Nelson G. Kling, Ringwood, N.J., assignors to Technicon Corporation, Ardsley, N.Y.
Filed Nov. 29, 1967, Ser. No. 686,459
Int. Cl. G01n 21/28
U.S. Cl. 23—253
8 Claims

ABSTRACT OF THE DISCLOSURE

A chromatography apparatus for the sequential automatic loading and analysis of a plurality of samples includes a high pressure, non-return, relief valve in the high pressure portion of the system, and a bubble detector in the colorimeter, for detecting system malfunctions and providing a signal in response thereto.

BACKGOUND OF THE INVENTION (1) Field of the invention

This invention relates to chromatography apparatus and particularly to a fail safe system for monitoring the operation of the apparatus.

(2) Description of the prior art

Chromatography apparatuses for the automatic analysis of liquid protein samples are well known and are shown, for example, in U.S. Pat. No. 3,010,798, issued Nov. 28, 1961 to E. C. Whitehead et al., and U.S. Pat. No. 3,166,929, issued on Jan. 26, 1965 to M. H. Pelavin. In such apparatuses, a sample is initially layered into the top of the column, which column may be packed with a suitable ion-exchange resin. Subsequently a stream of a suitable eluting liquid is passed through the column to strip the sample from the resin, certain constituents of the sample passing out sooner and others passing out later. A color forming reagent is continuously added to the stream of eluent from the column, which stream is divided into segments for mixing by gas segments, and the developed stream with the gas segments removed therefrom is passed through a colorimeter to continuously measure the optical density of the developed stream, whereby to provide an output signal which is responsive to the concentration of the different constituents of the sample.

Previously, such analyses took many hours for each sample, which sample was manually layered into the column; and then run automatically. If a fault developed in the system, the sample being processed might be lost, but it would be only that one sample which was lost. It has recently been proposed to shorten the length of time required to analyze each sample and to automatically load and analyze in sequence each of a plurality of samples. If a fault develops in such a system, not only will the sample being processed be lost, but all of the succeeding samples, unless the system is halted, will suffer the same fate.

SUMMARY OF THE INVENTION

Accordingly, it is an object of this invention to provide a fail safe monitoring system for an automatic chromatography analysis system. The system includes a combination of several devices for monitoring the operation of device; including a means for detecting the presence of gas in the normally gas free discharge end of the colorimeter fluid conduit and for generating a system shut down signal in such event, and means for periodically rendering the gas detector operable. The invention further includes an overpressure, non-return, relief valve disposed in the high pressure portion of the system, whose relief operation will result in the presence of gas to be detected by the gas detector.

BRIEF DESCRIPTION OF THE DRAWING

These and other objects, features and advantages of the invention will be apparent from the following specification thereof, taken in conjunction with the accompanying drawing in which:

FIG. 1 is a longitudinal cross-sectional view of a valve embodying this invention;

FIG. 2 is a schematic diagram of a colorimeter having a gas bubble detector and light source monitor embodying the invention;

FIG. 3 is a schematic diagram of the bubble detector of FIG. 2;

FIG. 4 is a schematic diagram of a tape controlled timer and a hydraulic and electrical controller utilized in the embodiment of the invention; and FIG. 5 is a schematic diagram of an automatic analysis system embodying this invention.

DESCRIPTION OF THE INVENTION

One possible malfunction of the chromatography system is an increase in the pressure of the high pressure system incorporating the column. This could be caused by a dirty sample, a blockage of the frit in the bottom of the column, or a failure in the column jacket hot water circulating system. If any of these or others occurs and the back pressure in the system goes above a predetermined maximum, it is desirable that the flow of the eluting liquid (or buffer) into the column be halted, to preclude possible damage to the column, including loss of the resin from the column. This halting of the flow of the eluting liquid is accomplished by an overpressure operated, non-return valve, such as is shown in FIG. 1, in the eluting liquid conduit upstream of the column.

The valve includes a substantially tubular housing 10 having a septum 12 which divides the anterior of the housing into an interior chamber 14 and a posterior chamber 16. A valve body 18 is secured within the anterior chamber by a retaining ring 20. The valve body has an anterior portion 22 extending forwardly from the housing. The body has a longitudinal bore therethrough having an anterior portion 24 which is threaded to receive a fitting 26 and a posterior portion 27 which receives a plunger 28. The body also has a radial bore 30 which receives a nipple 32, and communicates with a longitudinal bore. The fitting 26 has a longitudinal bore 34 which communicates with the longitudinal bore of the body.

The plunger 28 is secured into a bore in one end of rod 36 by a pin 38. The other end of the rod is secured into a knob 40 by a pin 42. The rod has an enlarged end portion 44 with a ramp or cam surface 46.

The rod is disposed within a longitudinal bore of a ball cage 48 which has an enlarged anterior bore portion 50 to receive the end portion 44 of the rod. A sleeve 52 is disposed within the posterior chamber 16 against the septum and has a ramp or cam surface 54. The ball cage has four radial apertures 56 therein, each of which receives a respective ball 57 therein. The cage is biased in the forward direction by a helical compression spring 58 captured on the cage between a shoulder 60 on the cage and an adjusting screw or collar 62. The collar is threaded within and to the posterior chamber.

An O-ring 64 is compressed between the fitting and the body. Two O-rings 65 and 66 are disposed about the plunger within the longitudinal bore.

The collar 62 is advanced to compress the spring 58, but not to fully compress it, so that when the predetermined over-pressure is developed against the plunger 28 it will compress the spring 58 rearwardly against the collar. Normally, the cage 48 is in its fully forward position, as shown in FIG. 1, with the balls 57 in their respective bores and each ball abutting the ramp surfaces 46 and 54. When the predetermined pressure is exceeded, the plunger 28 and the rod 36 are moved rearwardly. The balls 57 are each biased centrifugally through their respective bores by the cam surface 46 of the rod. When the balls clear the cam surface of the rod, the enlarged portion 44 moves under the balls, locking the balls in their centrifugal position. In this disposition of the rod, the plunger 28 has been displaced rearwardly a distance adequate to permit the passage of liquid through the bore 34 into the radial bore 30 and out the nipple 32.

On the reduction of pressure within the fitting 26 to any lesser pressure, the plunger 28 remains in its rearwardly displaced disposition. When it is desired to reset the valve, the knob 40 is pushed forwardly to move the rod forwardly with respect to the cage. When the enlarged portion 44 has cleared the apertures 56, the cam surface 54 moves the balls centripetally to the disposition shown in FIG. 1.

It will be appreciated that the diversion of the eluting stream from the column does not, in itself, shut down the overall chromatographic analytical system. However, it does cause a drop in the volumetric rate of flow of eluent plus reagent in the analytical system, since no eluent is passed into the analytical system. This decrease in flow, as well as decreases which may be caused by (1) a leakage in the high pressure system; (2) an interruption in the flow of any of the color producing reagents; (3) a failure of any pump tube to pump at its predetermined volumetric rate of flow; (4) a connection popping open; or (5) a decreased output of the positive displacement pump, will be detected by a bubble detector in the colorimeter.

A bubble detector and colorimeter lamp monitor is included in a colorimeter which may be of the type shown in U.S. patent application Ser. No. 529,466, filed by Jack Isreeli et al. on Feb. 23, 1966, incorporating a flow cell of glass tubing of the type shown in U.S. patent application Ser. No. 556,749, filed by Leonard T. Skeggs on June 10, 1966, both assigned to a common assignee.

The detector-monitor serves two functions. It checks the flow of fluids through the analytical system. It also monitors the light source of the colorimeter. As shown in FIGS. 2 and 3, the detector-monitor consists of a simple flow cell, a light detector, and a lens system to focus light from the colorimeter light source through this flow cell to the detector. A maximized transmittance of light occurs when the flow cell is filled with liquid. A decrease in the transmittance of light occurs when a bubble of gas is in the cell. A cessation of light from the light source will cause a cessation in the transmittance of light. On sensing a less than maximal light transmittance the detector-monitor generates a signal to shut down the total system. It is not feasible to operate the detector-monitor continuously, since the total system does not reach equilibrium immediately after start up. Also, it is theoretically possible for the analytical system to develop a momentary fluctuation in flow without a major failure occurring. For these reasons, the detector-monitor is made operational only on a plurality of occasions during the analytical run for each sample. One occasion occurs during the early part of the run, after an interval adequate to permit the system to reach equilibrium. If a second column is used, then another occasion should occur when the effluent stream from the second column is fed into the system for analysis.

In the particular embodiment shown in FIGS. 2 and 3, the treated stream of column effluent mixed with color producing reagents and segmentized by gas segments is transmitted to the colorimeter 100 at a volumetric flow rate of 1.57 ml./min. A first pump tube 102 in a peristaltic type pump 104 is coupled to the outlet of the sight passageway 106 of a flow cell 108. The pump tube draws liquid down from the supply passageway 110 through the sight passageway 106 at a rate of 0.42 ml./min. This sight passageway is irradiated by light from a source 112 passed through filters having a pass wavelength of 440 m$\mu$. A second pump tube 114 is coupled to the outlet of the sight passageway 116 of a flow cell 118. This pump tube draws liquid down from the supply passageway 110 through the sight passageway 116 at a rate of 0.32 ml./min. This sight passageway is irradiated by light from the source 112 passed through filters having a pass wavelength of 570 m$\mu$. The downstream end of the supply passageway 110 is connected to a 3-legged fitting 120 having an upwardly directed leg 122 which is coupled to a pump tube 124. This tube withdraws fluid from the fitting at a rate of 0.70 ml./min. In normal operation, as described in Ser. No. 556,749, supra, the gas segments remain in the relatively higher supply passageway 110, and only liquid is drawn down through the relatively lower sight passageways 106 and 116. Further, in normal operation, as disclosed in U.S. Pat. No. 3,109,714 issued to L. T. Skeggs on Nov. 5, 1963, the gas segments will all be removed through the upwardly directed leg 122. The downwardly directed leg 124 is coupled through an upwardly directed reverse bend 126 and a downwardly directed reverse bend 128 to the upper end of a substantially vertical, tubular flow cell 130 whose sight passageway is taken along a transverse chord of the cell, as shown in FIG. 3. The lower end of the flow cell 130 is coupled to inlet of an impedance, here shown as a helical coil 132 which discharges to waste.

Thus it will be seen that there is a total fluid (liquid plus gas) input to the colorimeter series connected analytical flow cells 108 and 118 and the bubble detector flow cell 130 at 1.57 ml./min. and an invariable total fluid (liquid plus gas) out take of 1.44 ml./min., with a remainder of fluid through the bubble detector flow cell of 0.13 ml./min. If there should be a drop in the input flow greater than 0.13 ml./min., air will be aspirated upwardly through the bubble detector from the outlet of the impedance 132. Alternatively, should a higher proportion of the input fluid be gas, a portion of this gas will be passed onto the bubble detector flow cell.

As shown in FIG. 3, the light source 112, a condensing lens assembly 132a, and a light detector and lens assembly 134 are disposed along an optical axis 136. The light detector may be a Light Amplifier Silicon Control Switch which is red light sensitive. The flow cell 130 is displaced a small distance $d$ off the optical axis, so that the rays on the optical axis do not go along the diameter of the flow cell, but rather, along a lesser chord. When there is no liquid, i.e. there is a gas segment, in the cell, most of the light rays are reflected within the wall of the cell. When the cell is filled with liquid, most of the rays are transmitted through the liquid and the cell to the detector.

The LASCS is adjusted to provide an output signal adequate to energize a control relay 138 when it receives maximum transmittance from the light source. If the transmittance decreases, the output signal decreases. If the transmittance decreases significantly, as in the case of a gas bubble, or no light provided by the source, the signal is inadequate to energize the control relay. When the control relay is deenergized, the analytical system is shifted into a shut down mode. The shut down mode consists of a substitution of a wash liquid for the effluent stream followed by a deenergization of the analytical system.

If an automatic sample supply system such as is shown in U.K. provisional patent application No. P 13,440/66 filed by A. R. Thomson on Mar. 25, 1966, together with a controller for a plurality of hydraulic and electrical circuits such as is shown in U.S. patent application No. 682,430, filed by John W. Eveleigh et al. on Nov. 13, 1967 is utilized, then the monitoring system can be expanded to include such apparatus.

A tape timer 300 is provided which is a two channel timing device, each channel comprising apertures in a tape 302, driven by sprocket wheels which are driven by a continuously running motor 304, which apertures cooperate with respective snap-action switches 306 and 308. Switch 306 of the first channel is coupled to the control relay 310 for the motor 312 for the controller 314 to periodically energize the motor to rotate the controller one angular increment whereat a predetermined arrangement of cams controls various pump tubes 316 and switches 318a through 318e. When switch 318e is actuated, it halts rotation of the controller. Switch 308 of the second channel is provided to insure that the proper sequence of operations of the controller is maintained, and to periodically actuate the bubble detector. At one or more positions of the controller, the snap-action switch 318a is closed by a respective cam. Subsequently, the second channel of the tape timer opens its snap-action switch 308. These switches are coupled to a logic network 320. If, when the type switch 308 opens, the controller switch 318a is not already closed, the network will generate a signal to put the analytical system in the shutdown mode of wash and stop. If, however, the switches 308 and 318a are in synchronization, the network will generate a signal which will make the bubble detector operative.

It will be appreciated that if desired, other malfunction detectors may be included in the system. For example, a leak detector may be included in each of the pumps.

A system for automatically, sequentially loading and analyzing a plurality of pairs of samples is shown in FIG. 5. A pair of chromatography columns is provided, one column 502 being used to separate out acid and neutral components, the other column 504 being used to separate out basic components. A sample supply device 506, similar to that taught in U.K. P 13,440/66, supra, is used to intermittently and successively provide pairs of identical samples to the pair of columns. A controller 314, as in FIG. 4, is used to control the hydraulic and electric functions of the system. A peristaltic pump 104 is used to advance fluids in the low pressure portion of the system and two positive displacement pumps 508, 510 are used to advance fluids in the high pressure portions of the system to the two columns 502, 504 respectively. The chemistry of the analysis is described in greater detail in U.S. patent application Ser. No. 682,425, filed by John W. Eveleigh on Nov. 13, 1967. The peristaltic pump 104 has a plurality of pump tubes 512, 513, 514, 515, 516, 518, 520, 102, 114 and 124. The tube 516 is normally occluded, and is periodically released by a pinch type gas bar. The tube 516 is coupled to a source 530 of nitrogen. The tube 518 is coupled to a source 532 of ninhydrin, and the tube 520 is coupled to a source 534 of hydrazine, to provide a nitrogen segmentized ninhydrinhydrazine reagent stream, for addition to the column effluent stream, after passage through an intra-segment mixing coil 536.

The controller has a plurality of resiliently compressible tubes 538, 540, 542, 544, 546, 548, 550, 552, 554 and 556, any predetermined combination of which may be closed by appropriate cams, as discussed with respect to FIG. 4.

Four sources 558, 560, 562 and 564 of different buffer solutions are respectively coupled to the tubes 540, 542, 544 and 546; a source 566 of sodium hydroxide is coupled to the tube 548, and all of these tubes are coupled to the pump 508 for the column 502. A source 567 of buffer solution is coupled through the tube 538 to the pump 510 for the column 504. The output of the column 502 is coupled through a debubbling fitting 570, at in U.S. Pat. No. 3,109,714, supra, to the tubes 550 and 552, and the outlet of the column 504 is coupled through a debubbling fitting 572 to the tubes 554 and 556. The debubbling arm 574 of the fitting 570 is coupled to the pump tube 512, and the debubbling arm 576 of the fitting 572 is coupled to the pump tube 513. The tubes 552 and 556 are coupled to the outlet of the mixing coil 536 and the inlet of a heating coil 568. The tubes 550 and 554 are respectively coupled to the pump tube 514 and 515 which discharge to waste. The tube 550 is also coupled to a tube 551 which discharges directly to waste, and tube 554 is also coupled to a tube 555 which discharges directly to waste. The outlet of the heating coil 568 is coupled through a cooling conduit 569 to the supply conduit 110 of the colorimeter 100. The outlet of the sight passageway 106 of the flow cell 108 is coupled to the pump tube 102. The outlet of the sight passageway 116 of the flow cell 118 is coupled to the pump tube 114. The debubbling leg 122 is coupled to the pump tube 124. The outlet of the bubble detector flow cell 130 is coupled to an impedance coil 132. The concentration signals provided by the colorimeter are recorded by a chart recorder 578.

A pressure relief valve 580, as in FIG. 1, is coupled to the outlet of the pump 508, and a similar pressure relief valve 582 is coupled to the outlet of the pump 510.

In the controller 314, a snap-action switch 318b controls the operation of the pump 508; a snap-action switch 318c controls the operation of the pump 510; a snap-action switch 318d controls the operation of the relay 506R which controls the indexing of the sampler 506; and a snap-action switch 318e controls the completion of an indexing movement of the controller 314. The snap-action switch 318a controls the operation of the synchronization test apparatus and the bubble detector apparatus, as discussed with respect to FIG. 4.

In use, the sample supply device 506 indexes one increment to position a fresh pair of samples over the columns. The controller is in its first position with tubes 540, 552 and 554 open, the remainder being closed. Pump 508 is energized. The first buffer is thus passed through the sample container into the column, thereby layering the sample from its container into the resin at the top of the chromatography column 502 and separating out the first constituents into the effluent stream which passes into the heating coil 568. A small portion of the effluent stream, containing any small quantities of air which may be present in the effluent stream is divided off at the debubbler 570 and pumped to waste by pump tube 512. Although the controller tube 550 is closed, the pump tube 514 is pumping, and presently pumps air in back-flow through the conduit 551 to waste. The pump tube 513 pumps substantially nothing from the debubbler 572. The pump tube 515 pumps air in back-flow through the conduit 555. The pump tubes 516, 518 and 520 pump in the reagent stream, and the pump tubes 102, 114 and 124 pump out from the colorimeter, as described previously.

During the first interval, as the tape timer 300 advances, the switch 308 is opened to check the synchronization of the controller via the switch 318a and to actuate the bubble detector, as previously described with respect to FIG. 4. When the first interval is ending, the tape timer closes the switch 306 to energize the controller motor 312 to rotate the controller to its second position. The rotation of controller into its next position actuates the switch 318e to deenergize the motor 312 to halt further rotation. In the second position, tubes 542, 552 and 554 are open, so that the second buffer is now pumped through the column 502. At the end of the second interval, the tape timer causes the controller to rotate to its next position. In the third position tubes 544, 552 and 554 are open, so that the third buffer is now pumped through the column 502. At the end of the third interval the tape timer causes the controller to rotate to its next position. In the fourth position, the tubes 546, 552 and 554 are open, so that the fourth buffer is now pumped through the column 502. At the end of the fourth interval the tape timer causes the controller to rotate to its next position. In the fifth position, the tubes 548, 538, 550 and 556 are open, and both the pumps 508 and 510 are energized. Thus sodium hydroxide is pumped through the sample container and the column 502 to clear the resin and thence through the pump tube 514 to waste. Meanwhile, the buffer for basics is pumped through the sample container to layer the sample into the upper portion of the resin of the column 504 and to separate the sample into the effluent stream which passes to the heating coil 568. A very small portion of this effluent, containing any air is removed at the debubbler 572 by the pump tube 513 and is discharged to waste. During this interval the tape timer again actuates the switch 308 to render the bubble detector operational for an interval. At the end of the fifth interval the tape timer causes the controller to rotate to the next position. In the sixth position the tubes 540, 538, 550 and 556 are open. Thus, the first buffer is again passed through the sample container and through the column 502 to regenerate the resin therein and thence to wash through the pump tube 514 and also the conduit 551. The buffer for basics continues to flow through the sample container and column 504 to the heating coil. At the end of the sixth interval the tape timer causes the controller to rotate to its next position, which will be the first position of the next cycle. Both pumps 508 and 510 are initially off, the switch 318d actuates the relay 506R to drive the sampler 506 to bring the next pair of sample containers onto the columns 502 and 504. After the new pair of sample containers are in position, the pump 508 is energized to pump the first buffer through the sample container and the column 502 as previously described.

As previously described, should an over-pressure situation develop in either of the pump 508—column 502 or pump 510—column 504 circuits, the respective valve 580 or 582 will open and divert the respective eluent stream. Such a condition will ultimately develop bubbles at the bubble detector, which will be detected, to halt the system.

What is claimed is:

1. An analytical apparatus for continuously treating a flowing liquid stream including spaced apart gas segments of predetermined volume and spacing for analysis for at least a constituent therein and continuously colorimetrically analyzing the treated stream comprising:
   means for transmitting the flowing stream;
   means for treating the flowing stream;
   colorimeter means for receiving the treated stream previously debubbled and normally free of gas, and for measuring its optical density;
   means including a conduit coupled to the colorimeter means and receiving at least a portion of said treated stream which is normally free of gas segments; and
   means for indicating a malfunction of the apparatus which malfunction effects gas in said conduit, comprising a gas detector coupled to said conduit for providing a signal on detection of gas in said conduit.

2. Apparatus according to claim 1 further including:
   a normally closed valve coupled to said transmitting means for monitoring the pressure therein;
   said valve including means for opening said valve in response to a pressure greater than a predetermined value and thereafter maintaining said valve open irrespective of a reduction in said pressure, to divert said flowing stream from said conduit;
   said conduit leading to a discharge portion open to gas at atmospheric pressure, in that when said valve is open gas is developed in said conduit for detection therein.

3. Apparatus according to claim 1 wherein:
   said conduit is tubular and light permeable;
   said gas detector includes
      a light source means and a light detector means having a common optical axis which passes through said light permeable conduit along a chord which is displaced from the diameter of said conduit,
   whereby when said conduit is filled with liquid light passes from said source means along said axis through said conduit and the contained liquid to said light detector means, and when said conduit has gas therein, light from said source means passing along said axis into said conduit is refracted within the wall of said conduit and significantly less light, indicating a malfunction, reaches said light detector means.

4. Apparatus according to claim 1 wherein:
   said colorimeter includes means upstream of said gas detector for withdrawing a portion of said treated flowing stream at a predetermined volumetric flow rate, said withdrawn portion normally containing all gas segments in said treated flowing stream, so that only excess gas, indicating a malfunction, enters said conduit from the upstream end thereof for detection.

5. Apparatus as defined in claim 1 wherein:
   said conduit leads to a discharge portion open to gas at atmospheric pressure; and
   said colorimeter includes means upstream of said detector for withdrawing a portion of said treated flowing stream at a predetermined volumetric flow rate, which rate if greater than said flowing stream causes gas to enter said conduit through said discharge portion for detection.

6. Apparatus as defined in claim 1 wherein:
   said conduit leads to a discharge portion open to gas at atmospheric pressure;
   said colorimeter includes means upstream of said gas detector for withdrawing a portion of said treated flowing stream at a predetermined volumetric rate, which rate if greater than the flowing stream causes gas to enter said conduit through said discharge portion for detection;
   said withdrawn portion normally containing all gas segments in said treated flowing stream, so that only excess gas upstream of said conduit enters the latter from the upstream end thereof indicating a malfunction.

7. Apparatus as defined in claim 6 wherein:
   said conduit is tubular and light permeable; and said gas detector includes a light source means and a light detector means having a common optical axis which passes through said light permeable conduit;
   whereby when said conduit is filled with liquid light passes from said source means along said axis through said conduit and the contained liquid to said light detector means, and when said conduit has gas therein, light from said source means passing along said axis into said conduit is refracted within the wall of said conduit and significantly less light, indicating a malfunction, reaches said light detector means.

8. Apparatus as defined in claim 7 wherein said signal is operative to shift the apparatus to a shut-down mode; further including means rendering said light detector means operative only periodically, to tend to avoid the detection of normal minor fluctuations of pressure in the colorimeter.

References Cited

UNITED STATES PATENTS

| | | | |
|---|---|---|---|
| 2,967,450 | 1/1961 | Shields et al. | 250—218X |
| 3,025,405 | 3/1962 | Dadas | 250—218 |
| 3,109,714 | 11/1963 | Skeggs | 23—253 |
| 3,199,523 | 8/1965 | McEathron | 137—467X |

MORRIS O. WOLK, Primary Examiner

R. M. REESE, Assistant Examiner

U.S. Cl. X.R.

23—230; 356—181, 186, 246